US008602402B2

(12) United States Patent
Noble et al.

(10) Patent No.: US 8,602,402 B2
(45) Date of Patent: Dec. 10, 2013

(54) TRASH COLLECTION AND REMOVAL SYSTEM

(76) Inventors: Robert Noble, Bridgewater, NJ (US); John Calo, Bridgewater, NJ (US)

( * ) Notice: Subject to any disclaimer, the term of this patent is extended or adjusted under 35 U.S.C. 154(b) by 0 days.

(21) Appl. No.: 13/488,479

(22) Filed: Jun. 5, 2012

(65) Prior Publication Data

US 2012/0233820 A1 Sep. 20, 2012

Related U.S. Application Data

(62) Division of application No. 12/577,753, filed on Oct. 13, 2009, now Pat. No. 8,322,924.

(51) Int. Cl.
*B23Q 1/25* (2006.01)

(52) U.S. Cl.
USPC .............................................. 269/85; 269/41

(58) Field of Classification Search
USPC ........................... 269/85, 43, 41, 95, 69, 143
See application file for complete search history.

(56) References Cited

U.S. PATENT DOCUMENTS

| | | | | |
|---|---|---|---|---|
| 4,671,528 | A | 6/1987 | Thompson | |
| 5,730,433 | A * | 3/1998 | Veres | 269/41 |
| 5,768,830 | A * | 6/1998 | Kelly | 52/127.1 |
| 6,135,701 | A | 10/2000 | Galloway | |
| 6,161,823 | A * | 12/2000 | Bradford | 269/3 |
| 6,491,294 | B1 * | 12/2002 | Hyatt | 269/41 |
| 6,835,343 | B2 | 12/2004 | Manthei et al. | |
| 7,484,284 | B1 * | 2/2009 | Mason | 29/243.55 |
| 8,210,510 | B2 * | 7/2012 | Li et al. | 269/246 |
| 2012/0233820 | A1 * | 9/2012 | Noble et al. | 24/457 |

* cited by examiner

*Primary Examiner* — Lee D Wilson
(74) *Attorney, Agent, or Firm* — Baker & Rannells, PA

(57) ABSTRACT

Disclosed herein is a trash collection and removal system that includes a flexible, foldable heavy-duty dumpster bag configured to engage with specially designed clamps secured onto tines of a front loader truck and engage with the dumpster bag by connecting and receiving pipes.

12 Claims, 15 Drawing Sheets

TRASH COLLECTION AND REMOVAL SYSTEM

CROSS REFERENCE TO RELATED APPLICATION

This application is a divisional application of U.S. application Ser. No. 12/577,753 filed on Oct. 13, 2009 now U.S. Pat. No. 8,322,924. The above listed applications are incorporated herein by reference in their entireties.

FIELD OF THE INVENTION

The present invention relates to a system for trash collection and removal. Specifically, the present invention relates to a trash collection and removal system using a flexible, disposable, industrial size trash dumpster bag and collection means through use of a front loader truck equipped with specially designed tine clamps.

BACKGROUND OF THE INVENTION

Large trash containers, known as dumpsters, are commonly used at construction and residential sites where large quantities of trash are generated. Public health and environmental pollution issues necessitate the safe collection, containment, transportation, and disposal means of solid wastes. Problems occur with metal dumpsters during the emptying of the trash inside of dumpsters by the accidental dispersal of the trash as it is being discharged into the hopper of the front loading truck as well as problems stemming from the decay of the dumpster itself over time. Use of metal dumpsters requires lead time for placement of an order and delivery of the same which can result in unwanted delays in the commencement of work. Further, traditional metal dumpsters are heavy and expensive to lease or to purchase. Acquisition and maintenance of a metal dumpster can increase costs as well as force work stoppage.

Two types of commonly used dumpsters for handling solid waste, are the “front loader” dumpster and the “rear loader” dumpster. These dumpsters typically include an interior compartment made from the dumpster walls and floors, as well as openings in which trash in first put in then through which the trash passes as it is being collected by garbage trucks. Typically, the dumpster has a hinged lid which swings open as the truck tilts the dumpster upside down. The trash then freely falls into the truck’s collection area and can miss the target truck compartment because of high winds.

In addition to temporary use at construction sites, dumpsters are commonly placed near residential sites such as apartment buildings in a semi-permanent manner for use by tenants. Over time, the dumpsters acquire rust and holes, as well as offensive odors. The dumpsters are not only unattractive, even when new, but later can become hazardous. Trash escapes from the holes and provides easy access to foraging animals.

For the foregoing reasons, it is apparent that a need exists for easily an transportable and inexpensive dumpster that can be used in conjunction with a front loading truck. A need also exists for a flexible dumpster that when used with a front loading truck reduces, and preferably eliminates, the accidental dispersal of solid waste into the environment during discharge of the solid waste into the hopper of the truck. Finally, there exists a need for a dumpster that is easily disposable yet sufficiently strong to support large loads.

SUMMARY OF THE INVENTION

The present invention overcomes the disadvantages and shortcomings of the prior art by providing a trash collection and removal system in which the dumpster is a flexible, foldable, disposable, heavy duty reinforced bag that effectively contains solid trash both prior to and during collection by a front loading truck in which the truck is equipped with clamps designed to attach to the tines of the truck and which work in combination with the dumpster bag.

BRIEF DESCRIPTION OF THE DRAWINGS

For a more complete understanding of the present invention, reference is made to the following detailed description of the exemplary embodiment(s) considered in conjunction with the accompanying drawing in which.

DETAILED DESCRIPTION OF THE EXEMPLARY EMBODIMENTS

Figure 1:
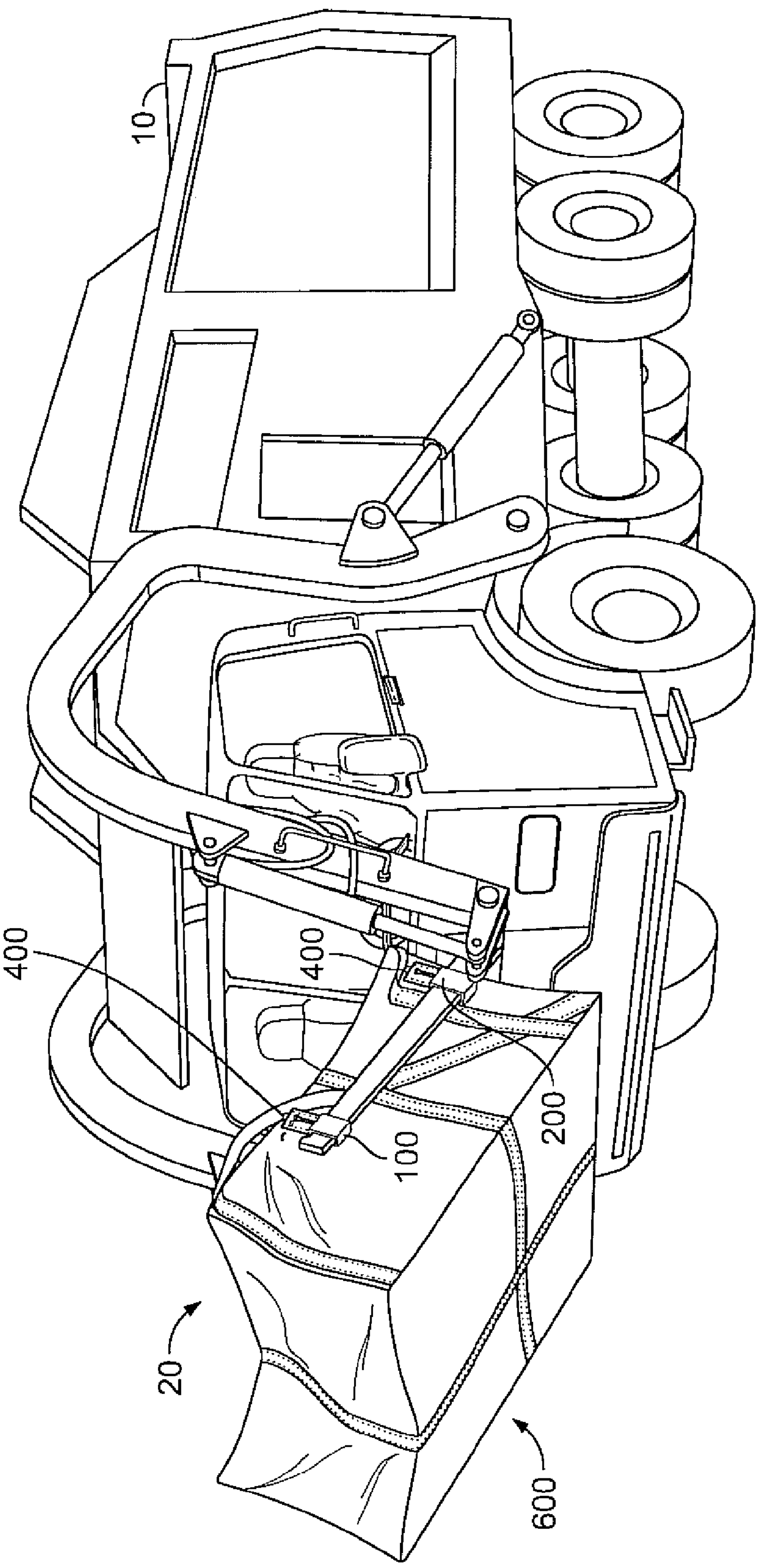
FIG. 1 is a perspective view of a trash collection and removal system constructed in accordance with an embodiment of the present invention showing the trash collection and removal system as it would be used with a front loader truck.
Figure 2:
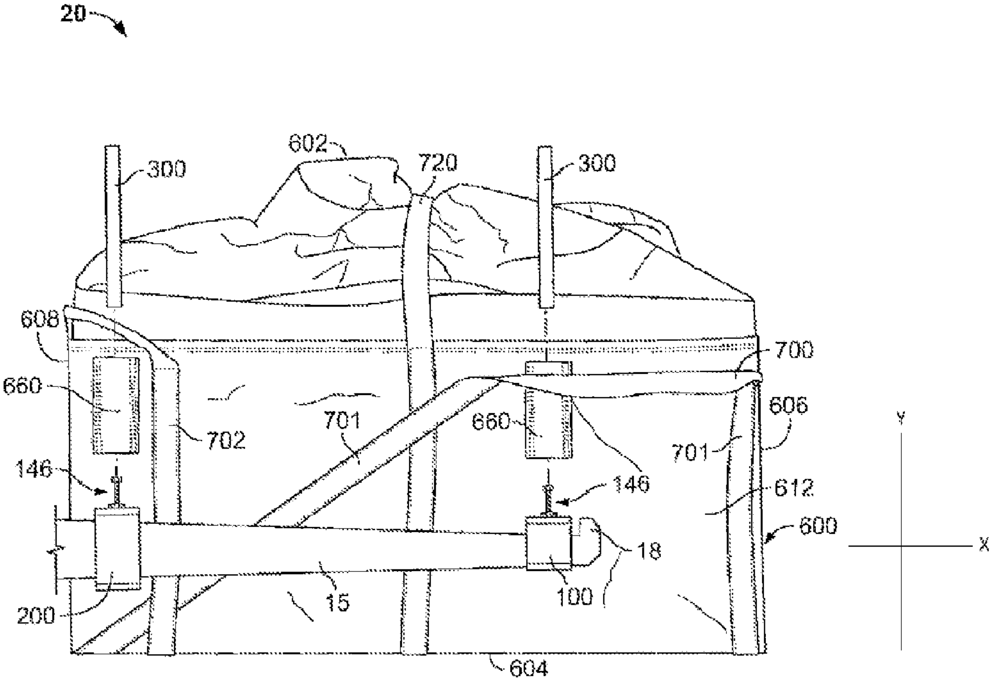
FIG. 2 is an exploded side cut away view of the trash collection and removal system shown in FIG. 1.
Figure 3:
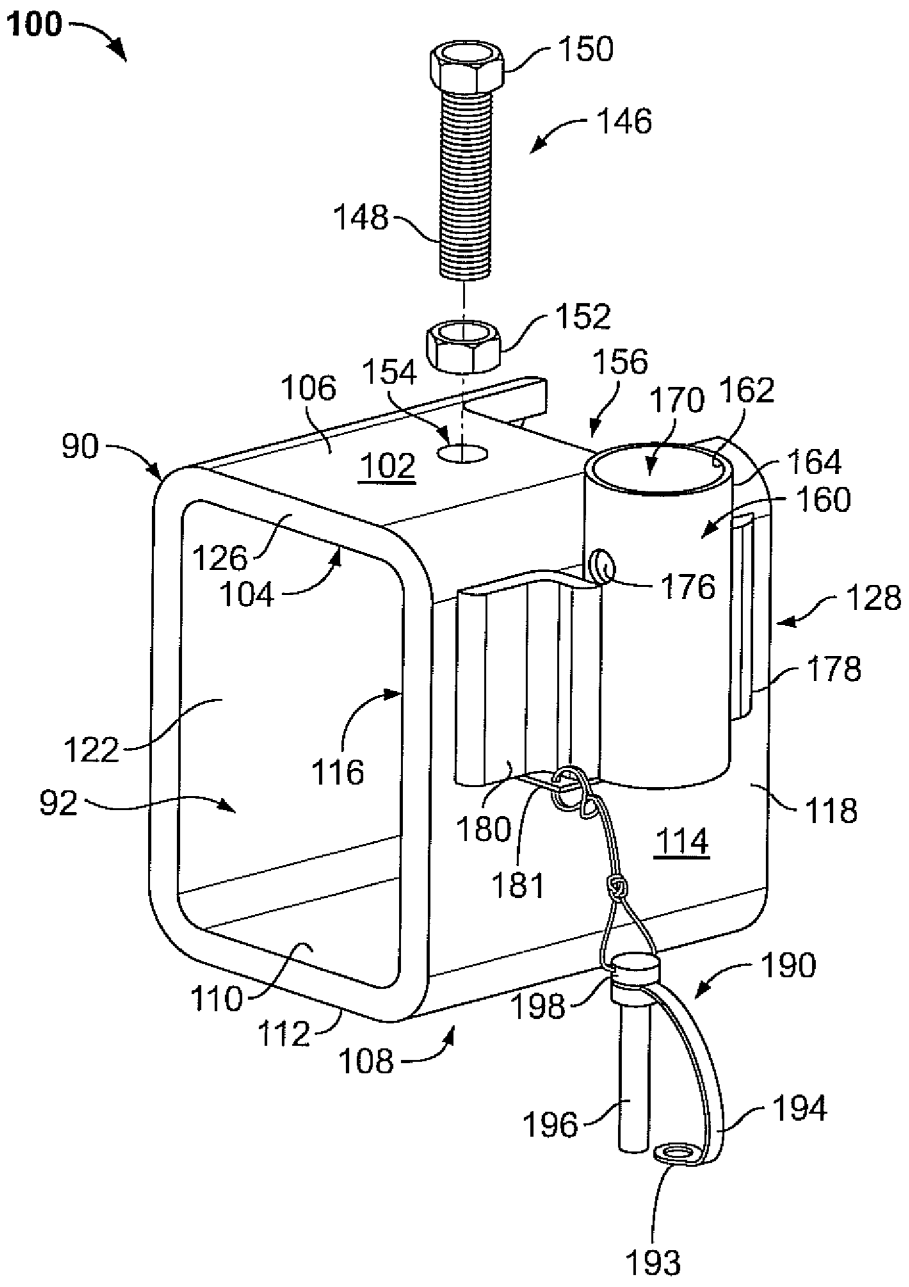
FIG. 3 is an exploded perspective view of the first embodiment of a tine clamp to be used on the tines of a front loader truck shown in FIG. 1.
Figure 4:
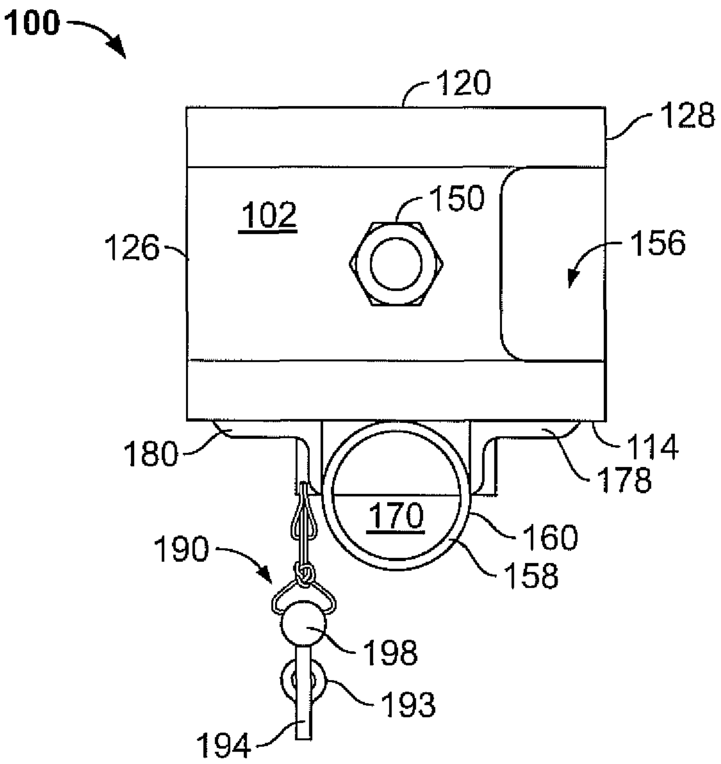
FIG. 4 is a top plan view of the first embodiment of a tine clamp to be used on the tines of a front loader truck shown in FIG. 1.
Figure 5:
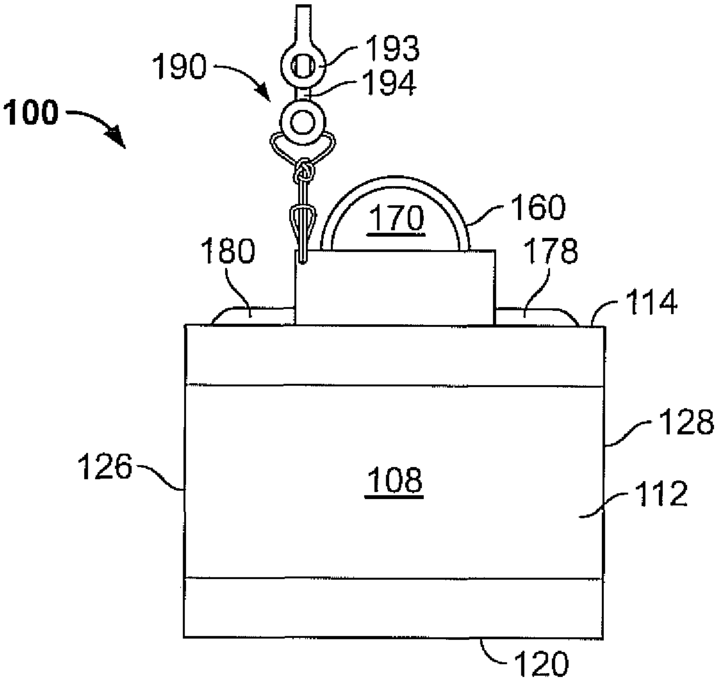
FIG. 5 is a bottom plan view of the first embodiment of a tine clamp to be used on the tines of a front loader truck shown in FIG. 1.
Figure 7:
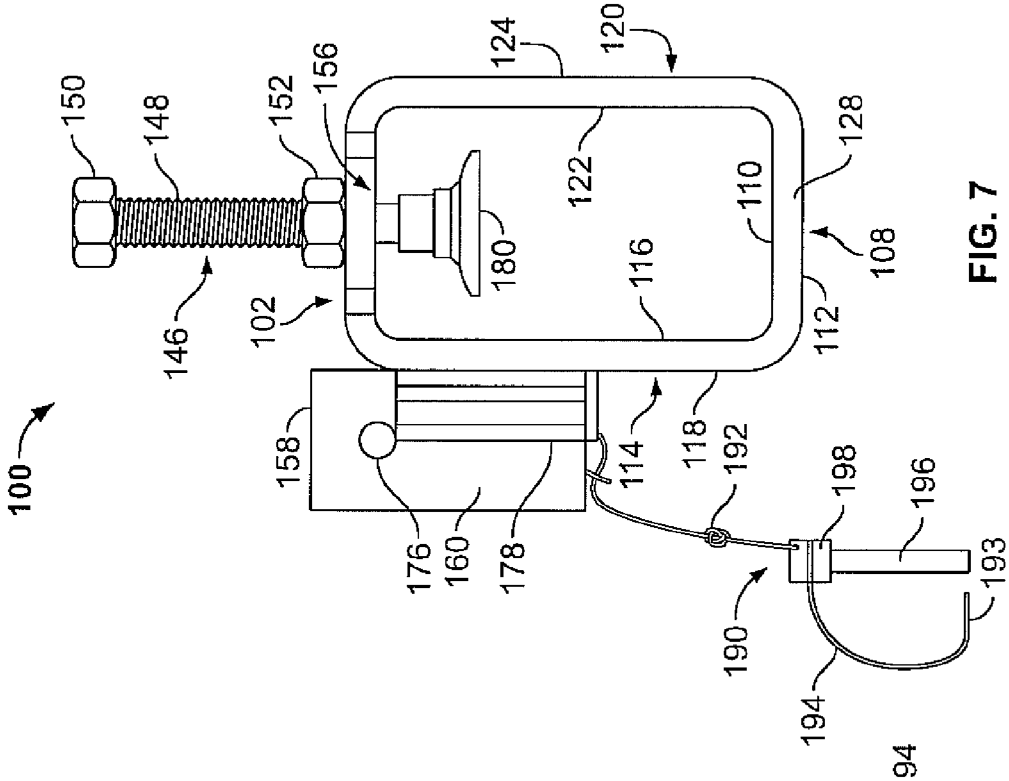
FIG. 7 is a rear elevational view of the first embodiment of a tine clamp to be used on the tines of a front loader truck shown in FIG. 1.
Figure 6:
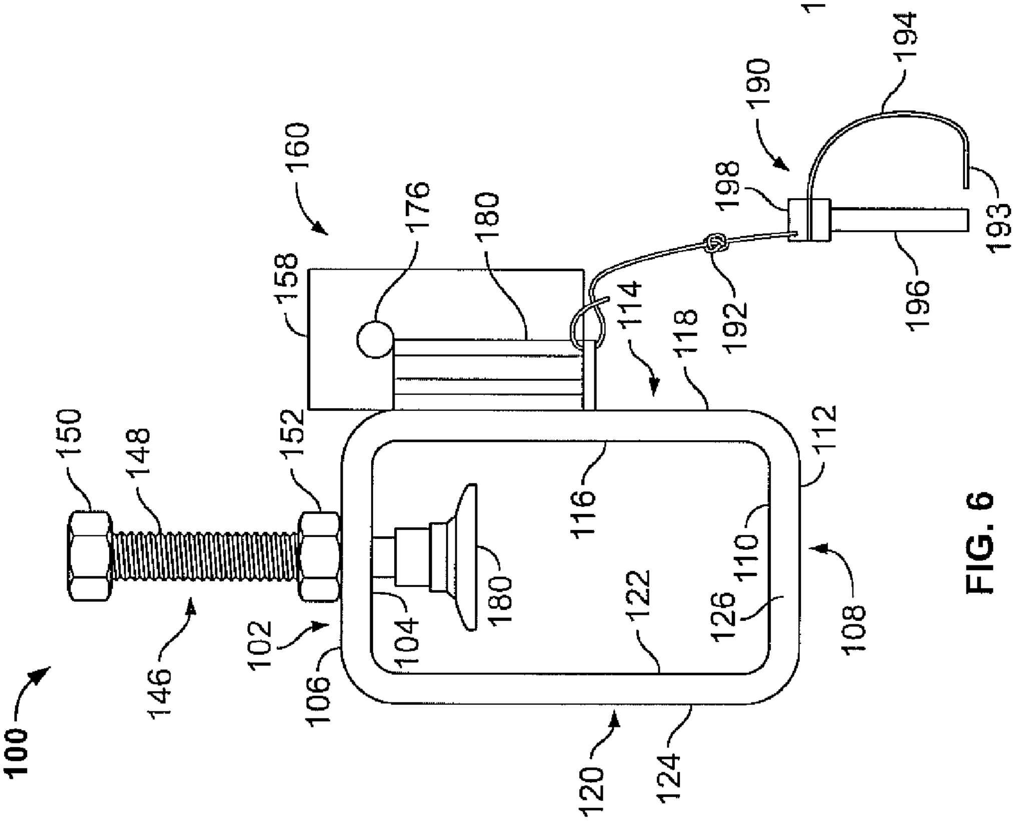
FIG. 6 is a front elevational view of the first embodiment of a tine clamp to be used on the tines of a front loader truck shown in FIG. 1.
Figure 8:
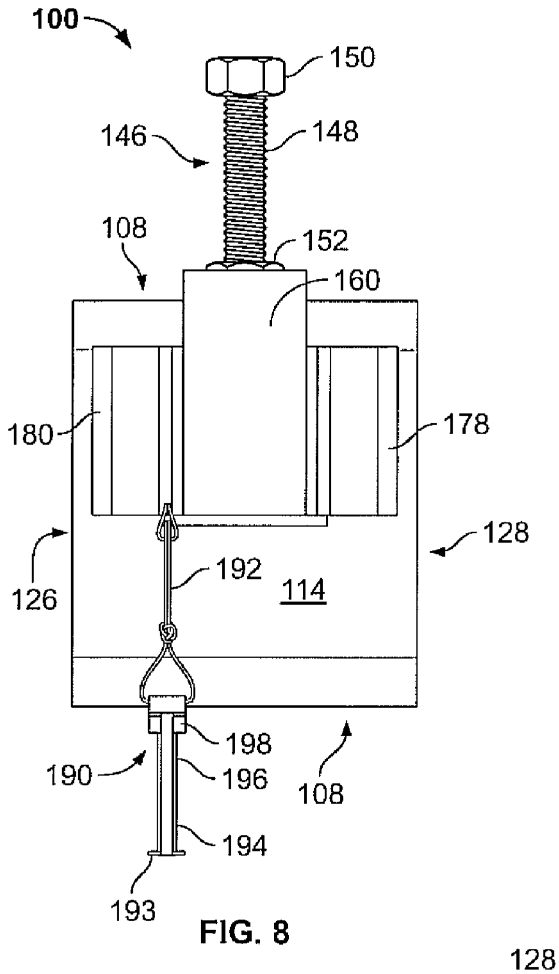
FIG. 8 is a right side elevational view of the first embodiment of a tine clamp to be used on the tines of a front loader truck shown in FIG. 1.
Figure 9:
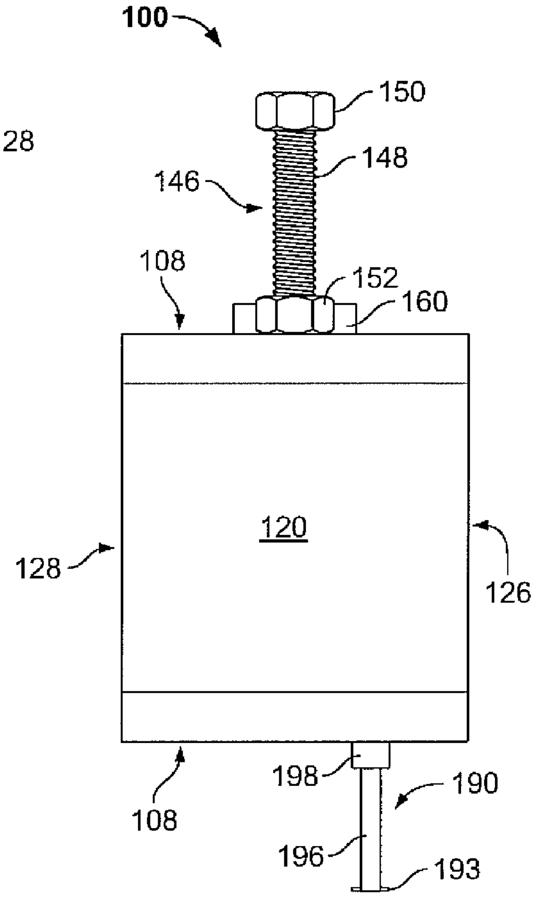
FIG. 9 is a left side elevational view of the first embodiment of a tine clamp to be used on the tines of a front loader truck shown in FIG. 1.

Referring to FIGS. 1-2, a trash collection and removal system 20 is constructed in accordance with the present invention is shown to include a dumpster bag 600, front loader clamps 100, 200 and connecting pipes 400. The trash collection and removal system 20 is configured to be used in combination with a front loader truck 10 in such a way that the larger clamp 200 is placed on each of the tines 15 of the truck 10 close to the truck body and secured in place by a clamp screw 146 and the smaller clamp 100 is placed on each of the distal ends of the tines 15 and secured in place by more clamp screws 146. These clamps 100, 200 are configured to include structures that engage with connecting pipes 400 through the dumpster bag sleeves 660 to releasably secure the bag 600 onto the truck tines 15 for lifting and disposal of trash contained in the bag 600 as will be discussed below with further detail.

Referring to FIGS. 2-9, a first tine clamp 100 is shown to include a clamp housing 90, clamp screw 146, clamp screw nut 152, clamp receiving pipe 160, and a locking pin assembly 190. The clamp housing 90 is essentially a hollow, rectangular cube in shape with four solid walls and two open walls. The top wall 102 of the housing 90 includes a U-shaped cut out 156. This cut-out 156 is designed to allow the first tine clamp 100 to matingly engage with front-edge teeth which can be found at the distal edges of some tines 15. Truck tines 15 slide through a first open wall 126, into the cavity 92 and out the second open wall 128.

The four solid walls of the clamp housing 90 include a top wall 102, bottom wall 108 opposite thereto, a right side wall 118 and a left side wall 120 opposite the right side wall 118. The first tine clamp cavity 92 results from the space formed by interior and exterior surfaces of the top, bottom, right and left side walls 102, 108, 118, 120. More specifically, the top wall 102 includes an interior surface 104 and an exterior surface 106 opposite thereto. The bottom wall 108 includes an interior surface 110 and an exterior surface 112 opposite thereto. The right side wall 108 includes an interior surface 114 and an exterior surface 116 opposite thereto which are substantially perpendicular to the top and bottom walls. The left side wall 108 includes an interior surface 122 and an exterior surface 120 opposite the right side wall 108 and which are also substantially perpendicular to the top and bottom walls, 102, 108.

The first tine clamp 100 attaches to a tine 15 of a truck 10 by means of a clamp screw 146 and screw attachment 140. The clamp screw 146 threadingly engages with the clamp by threading through the clamp nut 152 by screw threads 148 and through clamp hole 154 until the screw head 150 engages with the clamp nut 152. Inside the clamp cavity 92, the screw attachment 140 presses against the truck tines 15 to secure them thereon.

Referring to FIGS. 3-13, unitarily formed onto the right side wall 108 of the first tine clamp 100 is a receiving pipe 160 into which a connecting pipe, 300, 400 is placed during the trash collection process. The receiving pipe 160 is annular in cross section and is essentially an open ended hollow cylinder in shape. The receiving pipe includes an outer wall 164, and an inner wall 162 opposite thereto, which together form a receiving pipe cavity 170. The receiving pipe 160 also includes circular holes 176 through which a connecting pipe 300, 400 is secured into the receiving pipe 160. The receiving pipe 160 is joined to the tine clamp 100 on either side by a first bracket 178 and a second bracket 180.

A locking pin assembly 190 ties onto a hole in the second bracket 180. The locking pin assembly 190 secures the connecting pipe 300 into the receiving pipe 160 by pushing the pin body 196 of the locking pin assembly 190 through the holes 176 of the receiving pipe 160, and holes 330 in the connecting pipe 300. The locking pin assembly 190 also includes a pin cap 198 which is formed as a circular flat topped cylinder at one end of the pin body 196, a locking pin stop 194, and a pin string 192 which connects the pipe pin assembly 190 to the second bracket 180. After the pin body 196 secures the connecting pipe 300 into the receiving pipe 160, the locking pin stop 194 secures the pin body 196 in place to prevent it sliding off by placing its rounded end 193 onto the distal end of the pin body 196 at an angle slightly offset from perpendicular to prevent it from sliding off.

Figure 11:
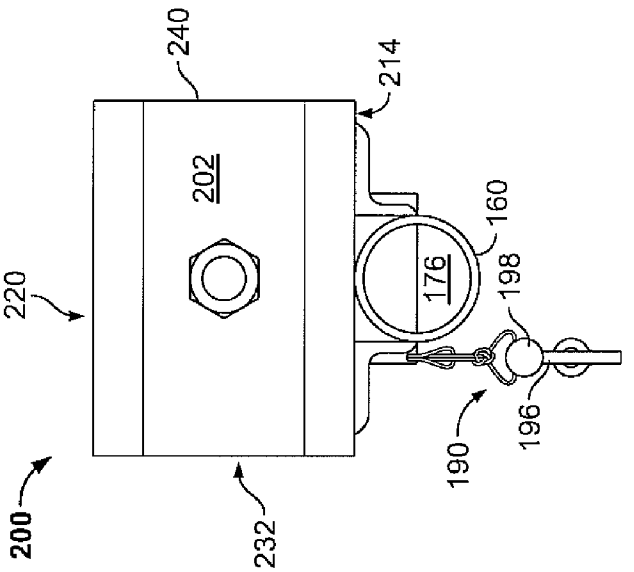
FIG. 11 is a top plan view of the second embodiment of a tine clamp to be used on the tines of a front loader truck shown in FIG. 1.
Figure 10:
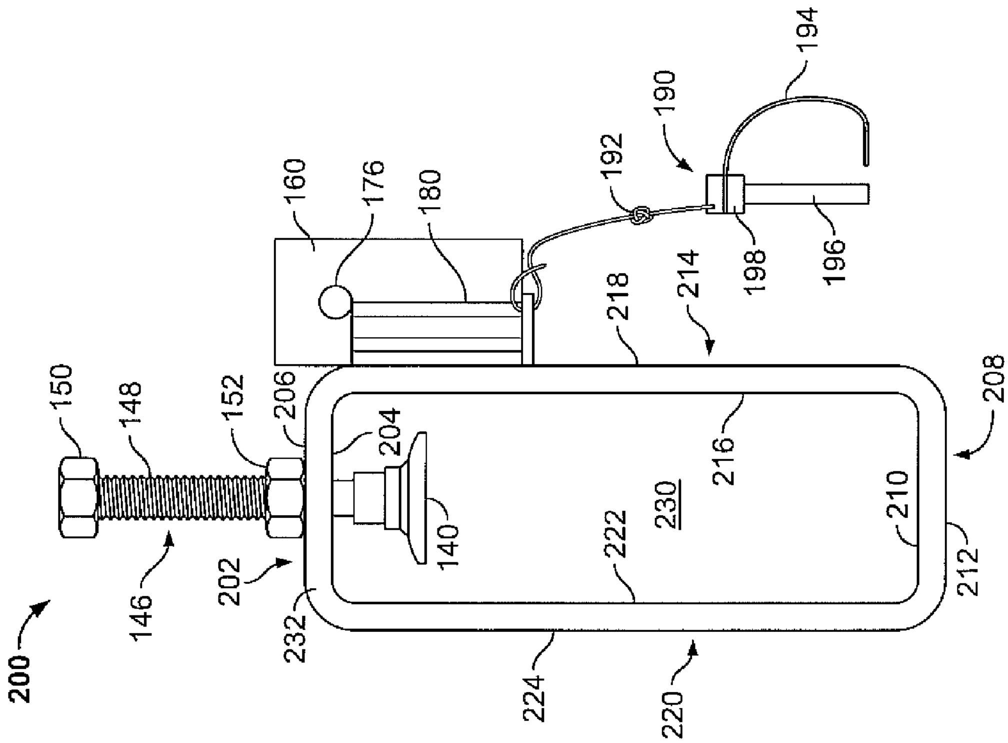
FIG. 10 is a front elevational view of the second embodiment of a tine clamp to be used on the tines of a front loader truck shown in FIG. 1.
Figure 12:
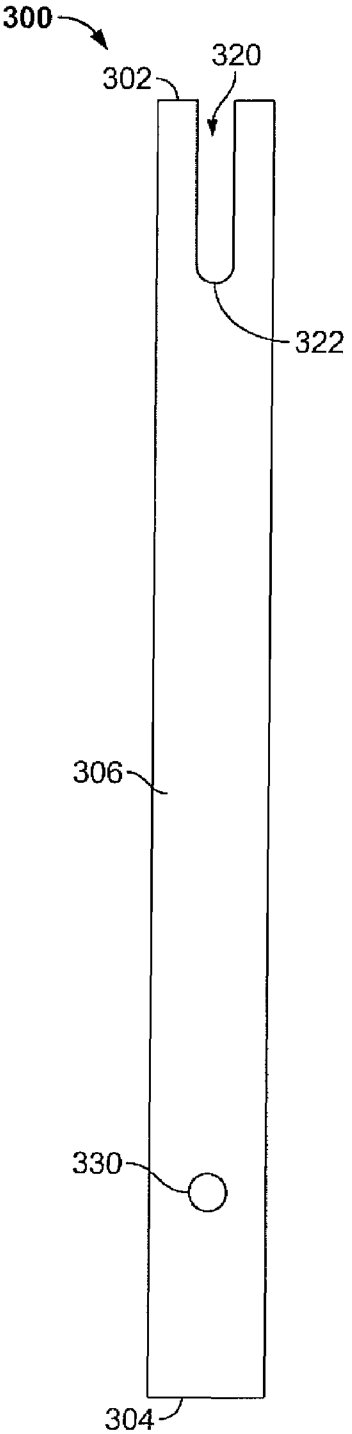
FIG. 12 is a front elevational view of the first embodiment of a connecting pipe of the trash collection and removal system shown in FIG. 1, a rear elevational view being a mirror image thereof.
Figure 13:
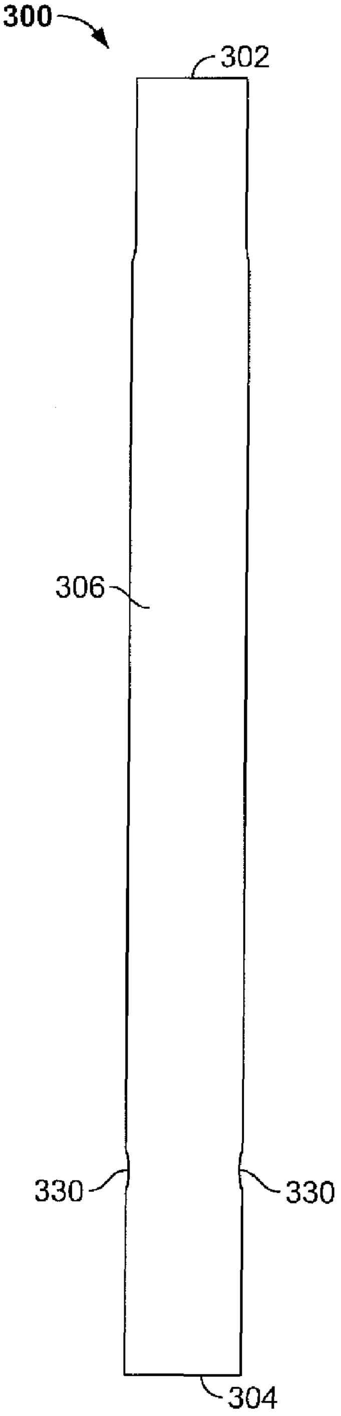
FIG. 13 is a right elevational view of the first embodiment of a connecting pipe of the trash collection and removal system shown in FIG. 1, a left side elevational view being a minor image thereof.
Figure 14:
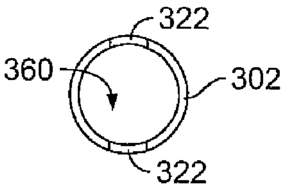
FIG. 14 is a top plan view of the first embodiment of a connecting pipe of the trash collection and removal system shown in FIG. 1.
Figure 15:
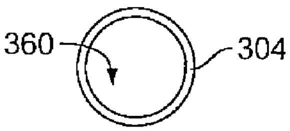
FIG. 15 is a bottom plan view of the first embodiment of a connecting pipe of the trash collection and removal system shown in FIG. 1.
Figure 16:
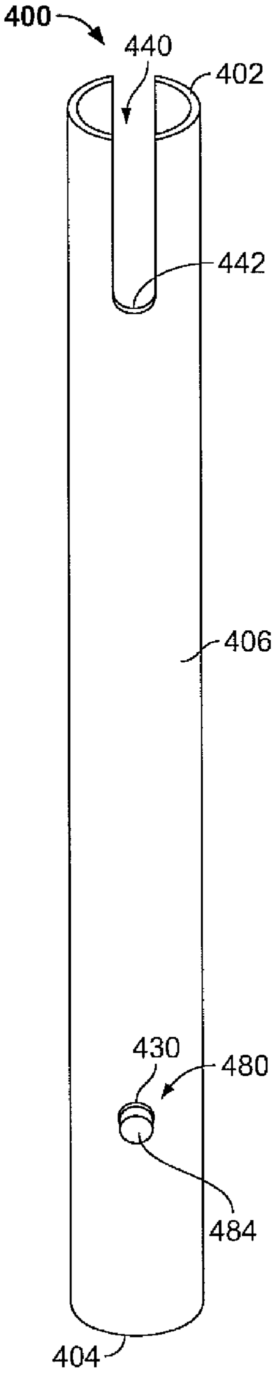
FIG. 16 is a perspective view of the second embodiment of a connecting pipe of the trash collection and removal system shown in FIG. 1 shown with a button clip inserted.
Figure 17:
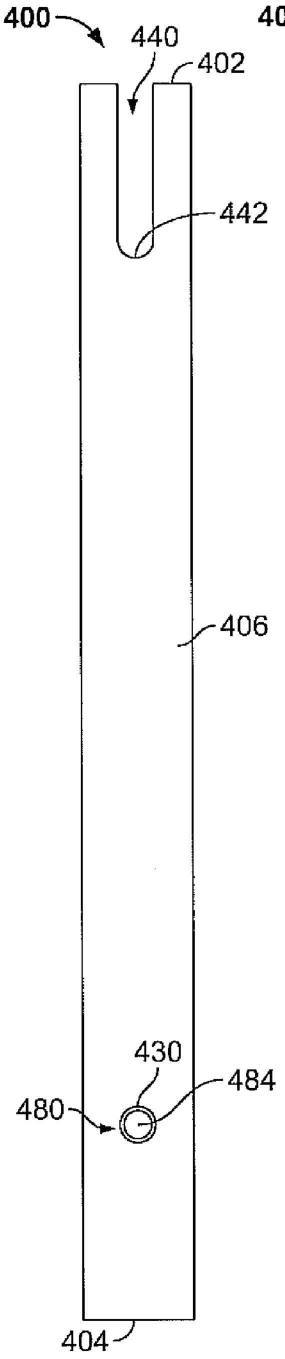
FIG. 17 is a front elevational view of the second embodiment of a connecting pipe of the trash collection and removal system shown in FIG. 1 shown with a button clip inserted, a rear elevational view being a mirror image thereof shown.
Figure 18:
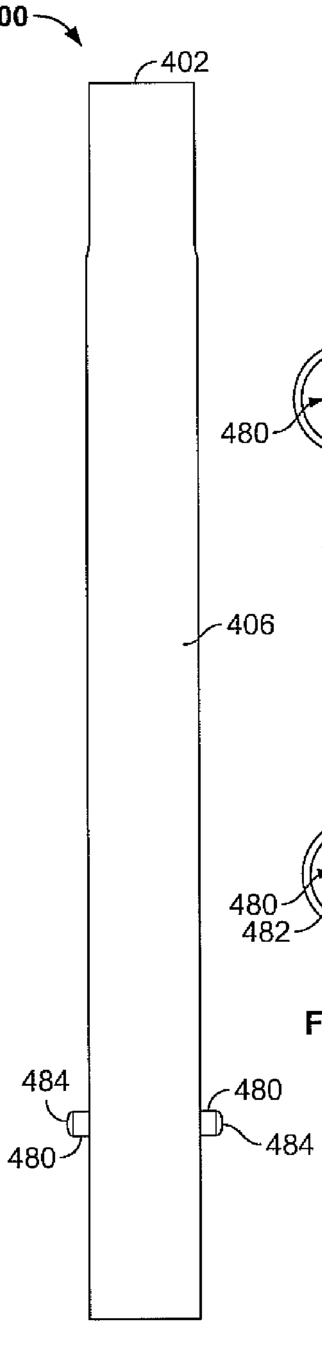
FIG. 18 is a right side elevational view of the second embodiment of a connecting pipe of the trash collection and removal system shown in FIG. 1 shown with a button clip inserted, a left side elevational view being a mirror image thereof.

Referring to FIGS. 10-11, a second tine clamp 200 is shown. The second tine clamp 200 is constructed to closely resemble the first tine clamp 100 except that it has a greater overall height to accommodate the thicker portion of the tines 15 of the truck because the tines 15 taper from the edge to a taller edges closer to the truck body outward. The second tine clamp 200 includes the clamp screw 146, clamp nut 152, screw attachment 140, receiving pipe 160, locking pin assembly 190 and first and second brackets 178, 180, but does not include a cut out on its tops surface as it does not need to matingly engage with any portion of the tine 15.

Still referring to FIGS. 10-11, the second tine clamp 200 includes a second clamp housing 201 which is essentially a hollow, rectangular cube in shape with four solid walls and two open walls. Truck tines 15 slide through a first open wall 232, into the cavity 230 and out the second open wall 240. The clamp housing 201 includes top wall 202, bottom wall 208 opposite thereto, a right side wall 218 and a left side wall 220 opposite the right side wall 218. The second tine clamp cavity 230 results from the space formed by interior and exterior surfaces of the top, bottom, right and left side walls 202, 208, 218, 220. More specifically, the top wall 202 includes an interior surface 204 and an exterior surface 206 opposite thereto. The bottom wall 208 includes an interior surface 210 and an exterior surface 212 opposite thereto. The right side wall 218 includes an interior surface 214 and an exterior surface 216 opposite thereto which are substantially perpendicular to the top and bottom walls. The left side wall 220 includes an interior surface 222 and an exterior surface 224 opposite the right side wall.

Referring to FIGS. 12-22, during the trash removal process, the receiving pipes 160 of the first and second tine clamps 100, 200 are positioned to releasably receive the connecting pipes 300, 400. In a first embodiment, receiving pipe 300 has an elongated annular hollow body 306 with a central cavity 360, a first end 302, a second end 304, a pin hole 330 on one side of the body 306, a second pin hole 330 on the other side opposite thereto, and a U-shaped cut out 320 at the first end 302 with a curved lower surface 322 into which straps 700 of the dumpster bag 600 are placed. The pin holes 330 are constructed to provide ingress and egress of the pin body 196 of the pin assembly 190.

Still referring to FIGS. 12-22, a second embodiment of the connecting pipe 400 is shown assembled with a button clip 480. Second receiving pipe 400 also has an elongated annular hollow body 406 with a central cavity 460, a first end 402, a second end 404, a pin hole 430 on one side, a second pin hole 430 on the other side opposite thereto, and a U-shaped cut out 440 with a curved lower surface 442 into which straps 700 of the dumpster bag 600 are placed. The pin holes 430 are constructed so that knobs 484 of the button clip 480 may slidingly pass through. Typically, the second connecting pipe 400 is assembled with the button clip 480 inserted in place prior to removal of the dumpster bag 600 for trash collection.

Figure 19:
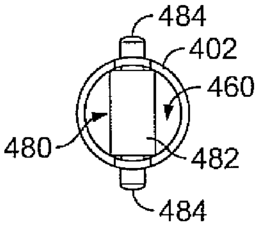
FIG. 19 is a top plan view of the second embodiment of a connecting pipe of the trash collection and removal system shown in FIG. 1 shown with a button clip inserted.
Figure 20:
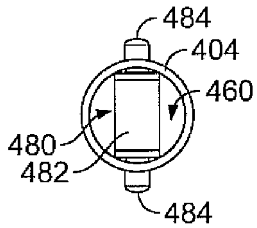
FIG. 20 is a bottom plan view of the second embodiment of a connecting pipe of the trash collection and removal system shown in FIG. 1 shown with a button clip inserted.
Figure 21:
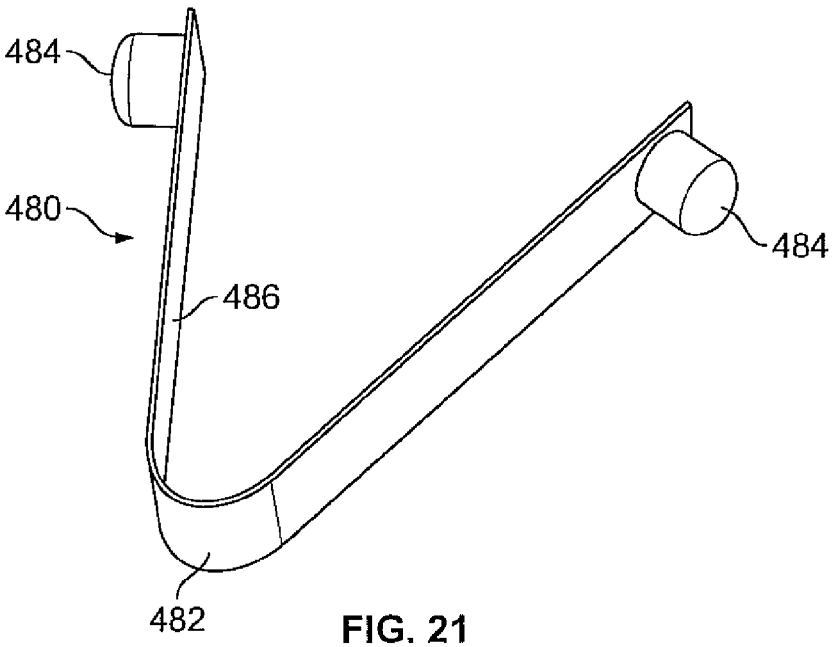
FIG. 21 is a perspective view of a button clip that is used with the second embodiment of the pipe of the trash collection and removal system shown in FIG. 1.

FIGS. 19-21 shows the button clip 480 in more detail. The button clip 480 forms a rounded V-shape in cross-section with an outer surface 482 and an inner surface 486 opposite thereto. The button clip 480 includes and a knob 484 at disposed on the outer surface 482 of each distal edge of the V, and which extends outwardly therefrom.

Figure 22:
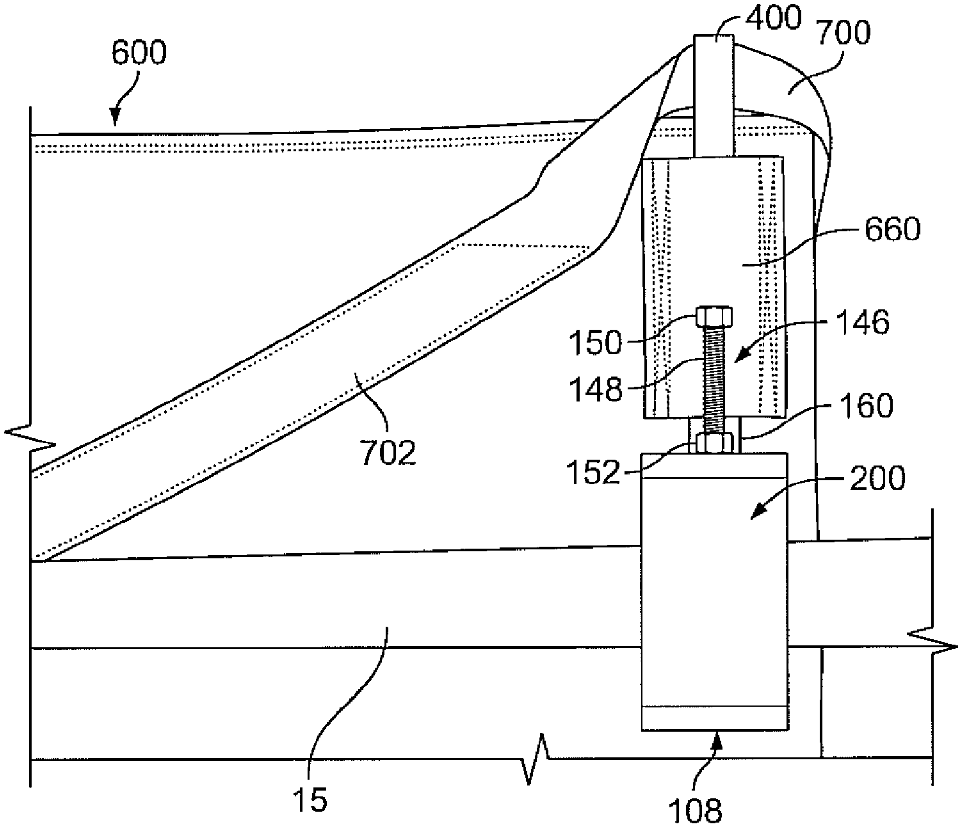
FIG. 22 is a left side cut away view of the trash collection and removal system shown in FIG. 1 showing the dumpster bag, clamp and pipe fully assembled.
Figure 23:
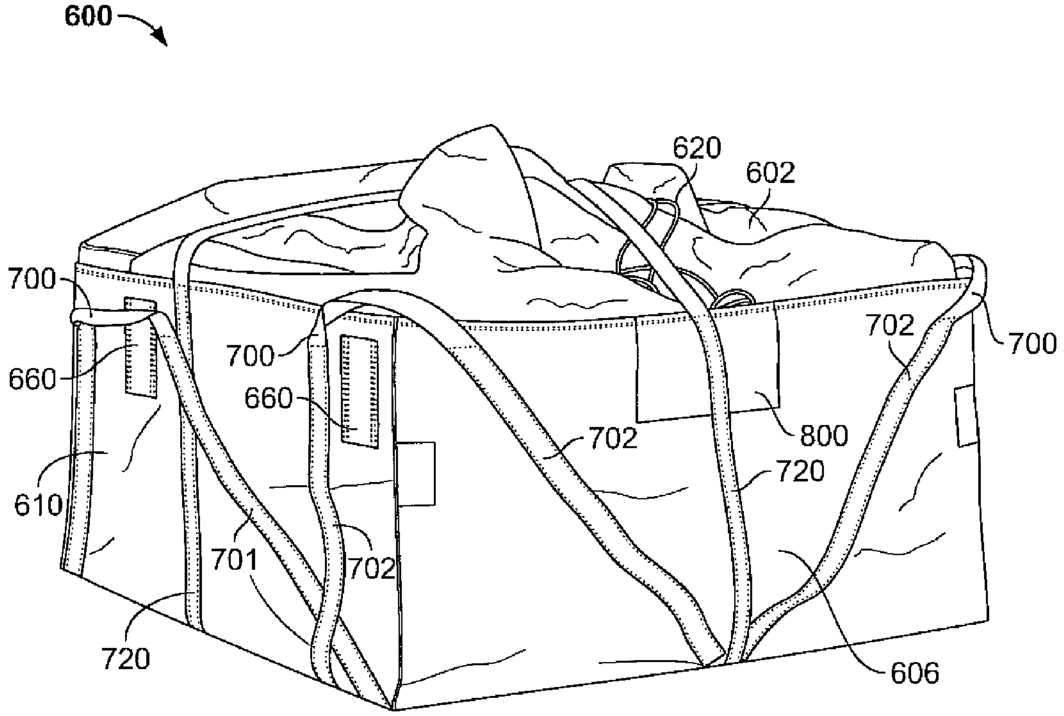
FIG. 23 is a perspective view of a dumpster bag shown in FIG. 1.
Figure 24:
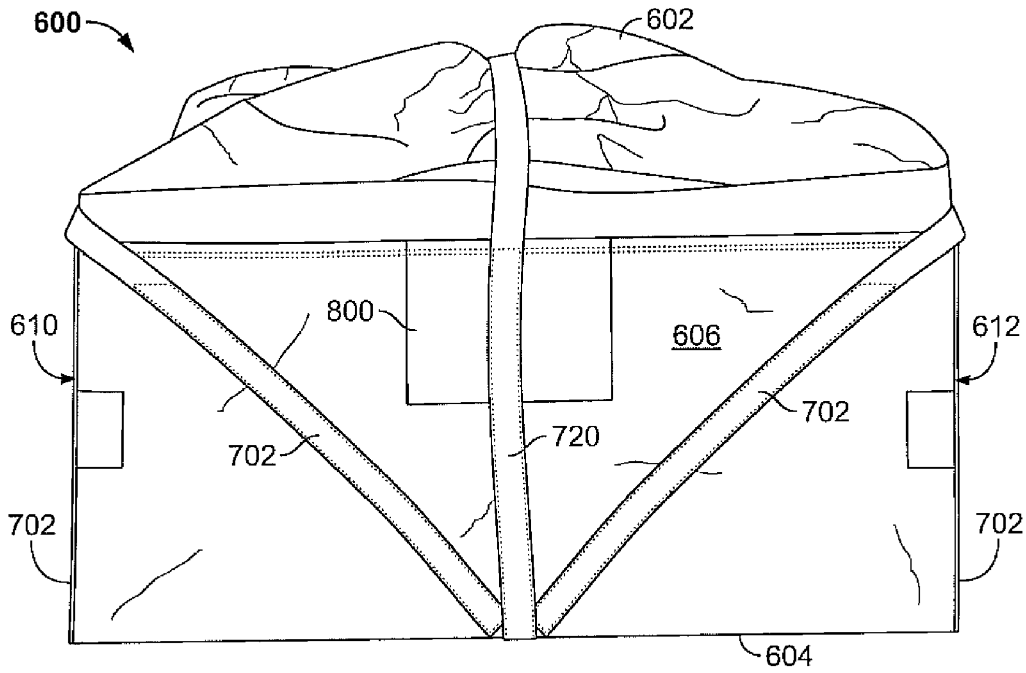
FIG. 24 is a front elevational view of a dumpster bag shown in FIG. 1.
Figure 25:
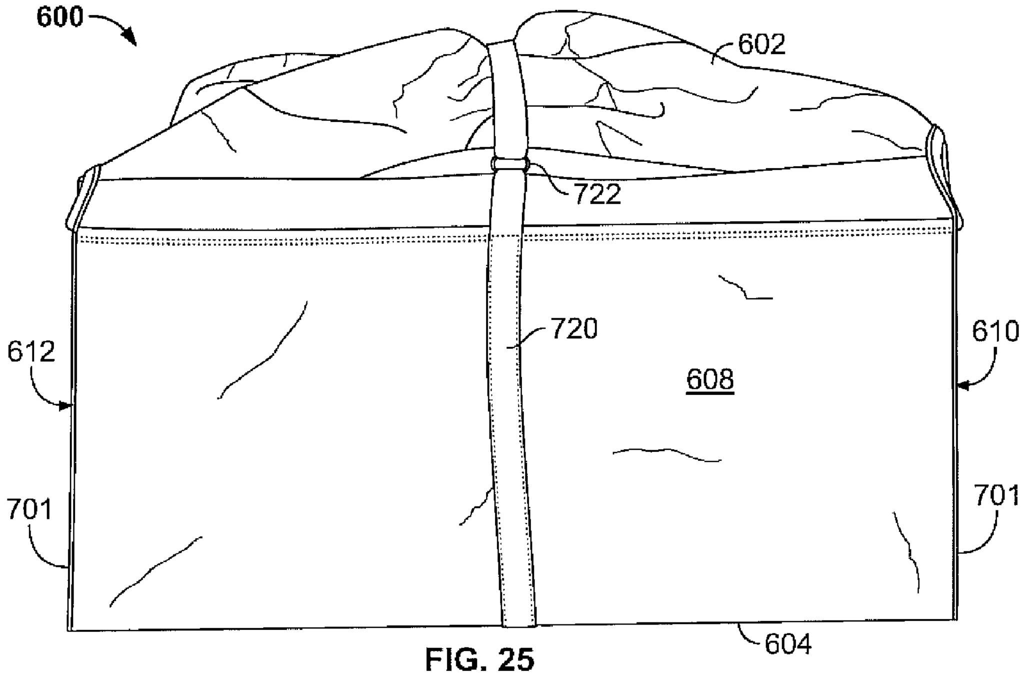
FIG. 25 is a front elevational view of a dumpster bag shown in FIG. 1.
Figure 26:
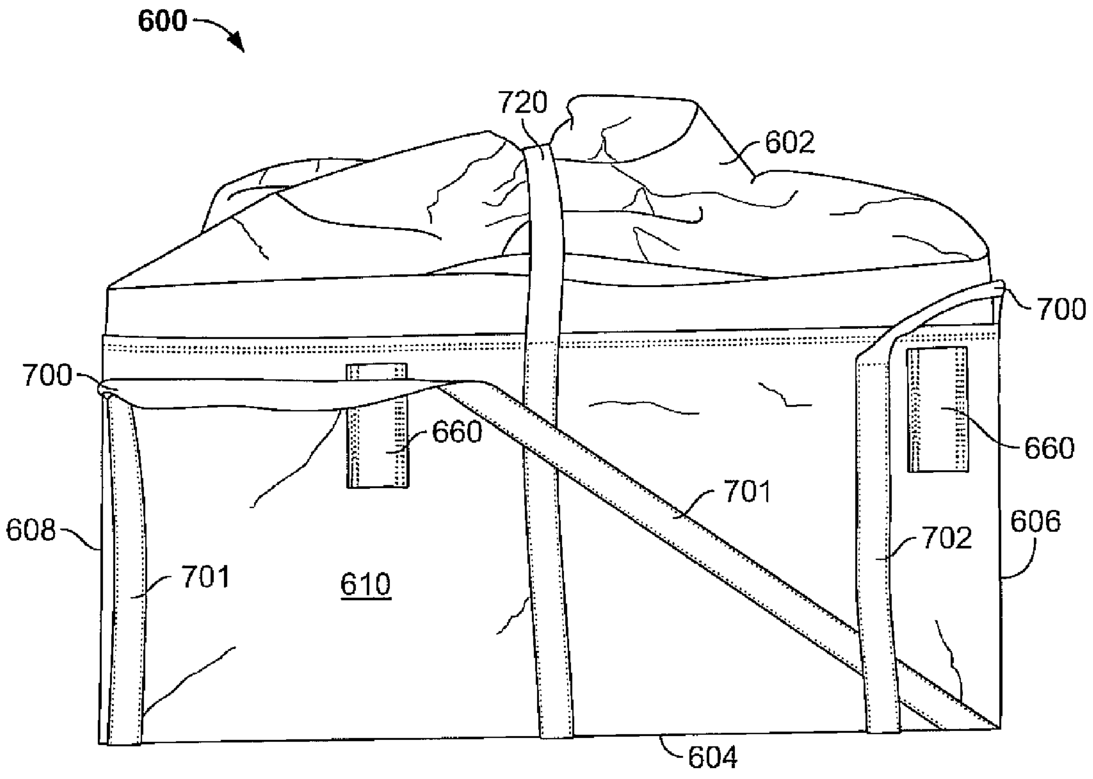
FIG. 26 is right side elevational view of a dumpster bag shown in FIG. 1, a left side elevational view being a mirror image thereof.
Figure 27:
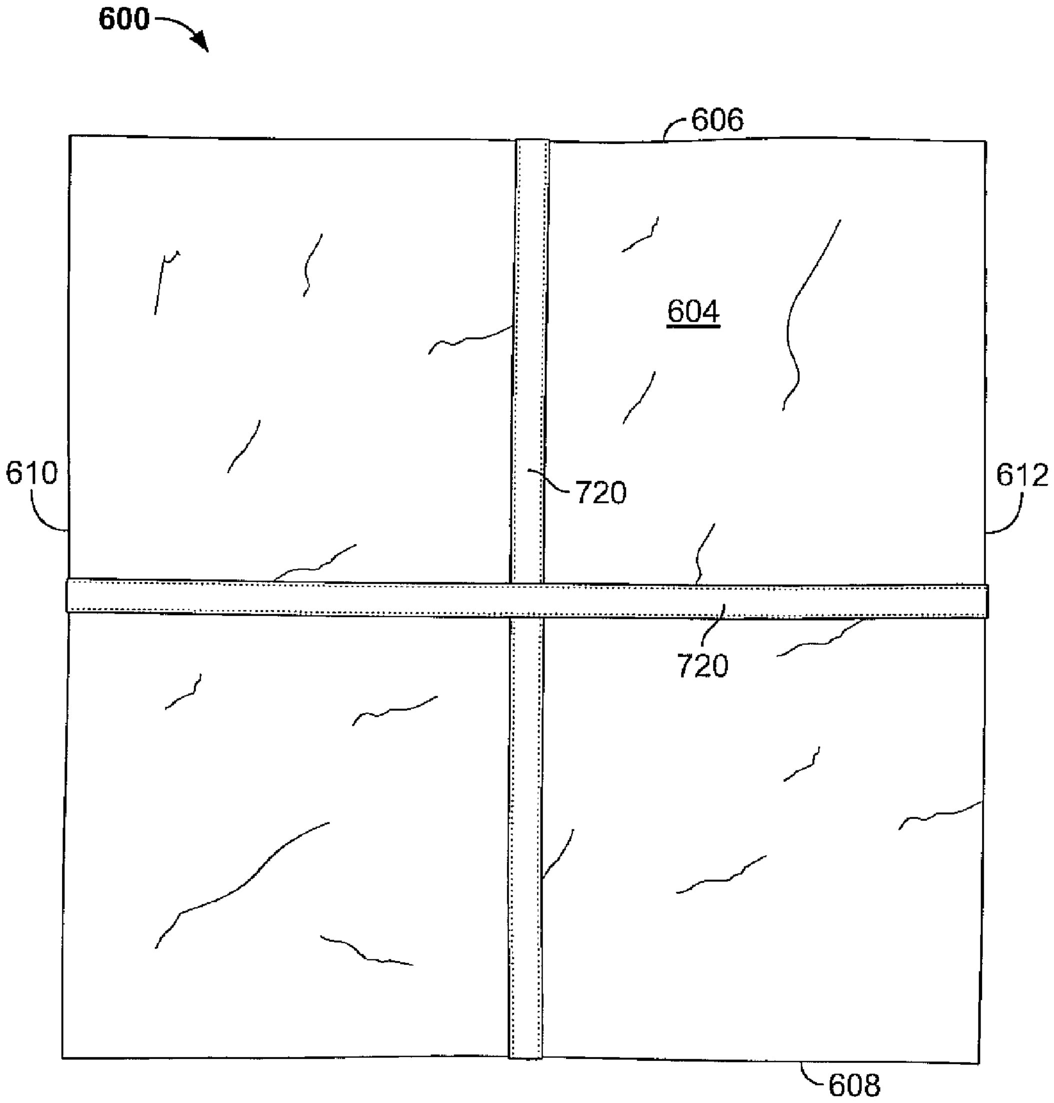
FIG. 27 is a bottom plan view of a dumpster bag shown in FIG. 1.
Figure 28:
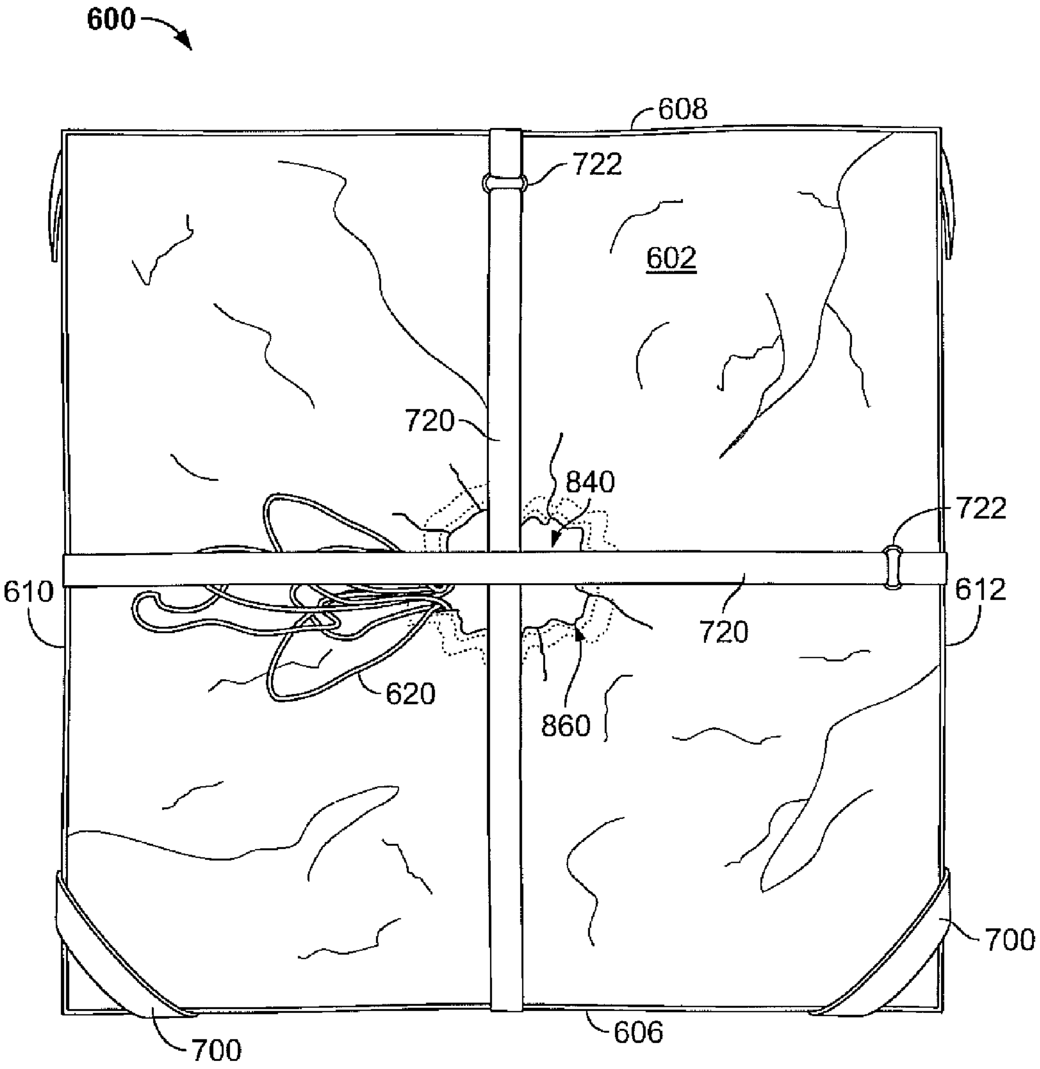
FIG. 28 is a top plan view of a dumpster bag shown in FIG. 1, showing the bag in a partially closed position.

Referring to FIGS. 2 and 22, the dumpster bag 600 is shown attached to the tine clamps 100, 200 which have been secured onto the truck tines 15 by means of the clamp screws 146. The connecting pipes 400 slidingly passes through the dumpster bag sleeves 600, into the receiving pipes 160 where button clips 480 secures the pipes into place. Then straps 700 are placed into the cut outs 320, 440 of the connecting pipes 300, 400 to complete the assembly. When the bag is lifted and rotated upside down, the dumpster bag 600 slides off of the connecting pipes 400 and into the truck dumping area. The connecting pipes 400 remain affixed to the tine clamps 100, 200 by means of the button clips 480, and only the dumpster bag itself falls into the truck dumpster area In the alternate embodiment, the connecting pipes 300 are secured onto the receiving pipes 160 of the tine clamps 100, 200 by means of the locking pin assemblies 190.

FIGS. 23-28 show the dumpster bag 600 in accordance with the invention. The dumpster bag 600 is typically manufactured from a heavy, porous material, typically polypropylene or polyethylene, or other material that is able to contain large loads without tearing when being lifted. The dumpster bag 600 is essentially box-shaped with a front side 606, a back side 608, a left side 610, a right side 612, a bottom surface 604 and a top surface 602. The top surface 602 includes a drawstring 620 that is woven around an opening 860 of the top surface 602 that is used to cover the inside cavity 840 for clean removal. The left side 610 and right side 612 include vertically disposed clamp sleeves 660 through which the connecting pipes 300, 400 slidingly pass to attach to the tine clamps 100, 200. The front side 606 includes a horizontally disposed sleeve 800 which is transparent and in which a sign or advertisement can be placed.

Dumpster bag 600 includes supporting straps 720 secured to the bottom surface 604. The supporting straps 720 crisscross over the bottom surface 604 to form right angles thereon and are sewn vertically along each side 606, 608, 610, 612 of the dumpster bag 600 approximately at each side's midsection. The supporting straps 720 are secured on the top surface 602 by means of strap clips 722.

The dumpster bag 600 also includes side straps 701, 702 which end in pipe straps 700 The side straps 701, 701 rise from the bottom surface 604 toward the top surface 602 and are sewn into the dumpster bag 600 on its left and right sides 610, 612. These pipe straps 700 are placed into the cut outs 320, 440 of the connecting pipes 300 400, respectively, to further secure the trash collection and removal system 20.

It will be understood that a person skilled in the art may make many variations and modifications without departing from the spirit and the scope of the present invention. For example, trash collection and removal system 20 could be used with any front loading vehicle that has tines, for example a fork lift. The trash collection and removal system 20 could include further stabilizing structures inside the cavity of the dumpster bag 600 to resist tearing during the removal process. All such variations and modifications, including those discussed above, are intended to be included within the scope of the present invention as defined in the appended claims.

What we claim is:

1. A clamp configured to slidingly engage with a loading tine wherein said clamp is substantially rectilinear and comprises a first wall, a second wall opposite said first wall, a top wall, and a bottom wall opposite said top wall, wherein said top wall has an aperture with a clamping shaft with a head, and said first wall has an elongated receiving pipe extending therefrom that is parallel with one said first wall or said second wall opposite said first wall.

2. The clamp of claim 1 wherein said receiving pipe includes a locking pin aperture and said clamp includes a locking pin releasably attached to said receiving pipe, wherein said locking pin slidingly engages with said locking pin aperture of said receiving pipe.

3. The clamp of claim 1, wherein said elongated receiving pipe is configured to attach to a second pipe releseably connected to a dumpster bag.

4. The clamp of claim 1, wherein said elongated receiving pipe has an outer wall such that the plane of said outer wall and first wall are parallel.

5. The clamp of claim 3, further comprising locking means to ensure said pipes remain connected when clamp is inverted, to allow dumpster bag to be released therefrom.

6. The clamp of claim 1, further comprising means to relesably connect said clamp to a tine such that perpendicular movement of the clamp relative to the tine is restricted.

7. The clamp of claim 1, wherein a wall has a threaded aperture formed therethrough that communicates with a screw to compress a tine.

8. The clamp of claim 7, wherein said screw has a first end configured to accept means to rotate the screw to tighten and loosen it relative to a tine and a second end configured to engage with the tine and restrict movement of the clamp along axis of the tine.

9. A combination of a clamp and dumpster truck configured to engage a clamp with a tine, the combination comprising:

a clamp having an outer wall surrounding a substantially hollow internal area and having an aperture that houses a clamping shaft;

a receiver adjacent said outer wall, said receiver having a first wall extending from said outer wall whereby a plane of said outer wall and said first wall are parallel;

an opening formed by said outer wall such that said opening is capable of allowing a portion of a tine to pass therethrough allowing the clamp to straddle a portion of said tine;

a connector releasably engaged to a dumpster bag, wherein the connector is sized and shaped to attach to said receiver; and said combination further comprising:

a dumpster truck that comprises a tine that locks to said clamp, wherein when said clamp is inverted, the dumpster bag is released from the connector into refuse.

10. A clamp according to claim 9 wherein said clamp has an internal area, and said tine has an external area that decreases along its axis whereby a proximal area of said tine is greater than a distal area of same tine, such that said change in external area restricts movement of the clamp along an in the proximal direction of said tine when the external area of the tine is greater than the internal area of said clamp.

11. A clamp according to claim 9 wherein said clamp has a lock to selectively restrict movement of the clamp in relation to the tine along an X axis.

12. A clamp according to claim 9 wherein said tine has a hook at its distal end that is shaped and sized to prevent the clamp from detaching from the tine when clamp is slidingly engaged thereto and unrestricted from distal movement along axis of tine.

* * * * *